United States Patent [19]

Horiguchi et al.

[11] Patent Number: 4,722,949

[45] Date of Patent: Feb. 2, 1988

[54] NON-ASBESTOS FRICTION COMPOSITION CAPABLE OF MANUFACTURING IN DRY PROCESS

[75] Inventors: Kazuya Horiguchi; Kazushige Kiba, both of Hanyu, Japan

[73] Assignees: Akebono Brake Industry, CO., Ltd., Tokyo; Akebono Research and Development Centre Ltd., Hanyu, both of Japan

[21] Appl. No.: 925,387

[22] Filed: Oct. 31, 1986

[30] Foreign Application Priority Data

Nov. 15, 1985 [JP] Japan ................................. 60-256130

[51] Int. Cl.$^4$ .......................... C08K 7/14; C08K 3/26; C08K 3/00
[52] U.S. Cl. .................................. 523/153; 523/155; 523/156; 524/16
[58] Field of Search ....................... 523/153, 155, 156; 524/16

[56] References Cited

U.S. PATENT DOCUMENTS

| | | | |
|---|---|---|---|
| 2,553,215 | 5/1951 | Schultz | 523/156 |
| 2,569,539 | 10/1951 | Schultz | 523/156 |
| 2,787,569 | 4/1957 | Smith | 524/16 |
| 2,954,853 | 10/1960 | Maierson et al. | 524/16 |
| 4,219,452 | 8/1980 | Littlefield | 523/156 |
| 4,373,038 | 2/1983 | Moraw et al. | 523/156 |

FOREIGN PATENT DOCUMENTS 57-85876  5/1982  Japan ................................. 523/153

OTHER PUBLICATIONS

DuPont; DuPont Develops Pulp Form of "Kevlar" for Asbestos Replacement Applications; Bulletin; Feb. 1981; 523-155.

Primary Examiner—Lewis T. Jacobs
Attorney, Agent, or Firm—Oblon, Fisher, Spivak, McClelland & Maier

[57] ABSTRACT

A non-asbestos friction composition capable of manufacturing in dry process is disclosed characterized in that, to a composition used 1 to 10 vol. % of aramid fiber pulp and 10 to 40 vol. % of inorganic fibers and added with binder resin and friction modifier, 1 to 6 vol. % of cork powder is added as a processing aid.

5 Claims, No Drawings

NON-ASBESTOS FRICTION COMPOSITION CAPABLE OF MANUFACTURING IN DRY PROCESS

BACKGROUND OF THE INVENTION

The present invention relates to a non-asbestos friction composition having made it possible to manufacture the mold type facing and pad lining using aramid fiber pulp and inorganic fibers in dry process.

In the manufacture of asbsestos friction materials for brake or clutch with mold, the formulated mix has been molded preliminarily with prepress as a pretreatment in the hot press process. This prepress process could be carried out in all ways of dry and wet process because of the lack of spring back characteristic in asbestos.

In recent years when the regulation of asbestos has been strengthened and asbestos cannot be formulated into the friction materials, it is requested to use the fibers with high heat resistance and high reinforcement property, which are important factors having been performed with asbestos in the friction materials, as substitutes.

There, as the substitutes of this asbestos, use of glass fibers, aramid fibers, mineral fibers, natural fibers, etc. is tried and the friction materials used these fibers are known in, for example, U.S. Pat. No. 3967037, No. 4373038, No. 4465796, etc. However, all of the fibers aforementioned cannot be molded preliminarily in dry process because of large spring back. Therefore, it is a present status that the preliminary molding cannot help but rely entirely on wet manufacturing process utilized the adhesive force of solution.

However, the manufacture in wet process is undersirable since it has an advantage to suppress the spring back of said fibers, but, on the other hand, there are rising in expenses due to the use of solvent and the addition of drying process and an anxiety in the obstruction of workers health by solvent. The invention has been made to dissolve these problems.

SUMMARY OF THE INVENTION

The invention has been completed as a result of finding that the preliminary molding in dry process is possible by adding 1 to 6 vol. % of cork powder as a processing aid to a composition in which, though 10 to 40 vol. % of inorganic fibers, the spring back characteristic thereof being largest among a lot of asbestos-substitutable fibers, may be used, 1 to 10 vol. % of aramid fiber pulp (trade name: Kevlar pulp) is used together and, besides, binder resin and friction modifier are added.

DETAILED DESCRIPTION OF THE INVENTION

The function of foregoing cork powder used as a processing aid is considered to be due to that around 6% of moisture contained originally in the cork powder exude by the high pressure at the time of prepress to give appropriate degrees of humidity to the surrounding powders and fibers and this densifying pressure makes the preliminary molding possible.

As the inorganic fibers aforementioned, those with a diameter of 6 to 13 $\mu$m and a length of less than 10 mm are preferable. The reason lies in that, if the fiber length exceeds 10 mm, the dispersion is apt to become poor at the time of agitation resulting in unstable physical conditions. Moreover, smaller diameter of fibers is preferable because of less irritation to the skin at the time of handling, but, if too small, the fibers are in danger of breaking at the time of manufacture. Therefore, the range from 6 to 13 $\mu$m is suitable.

The amount of inorganic fibers to be formulated according to the invention holds a close relationship to the strength and the more the better in this respect. But, if over 40 vol. %, the preliminary molding becomes difficult. Therefore, it is necessary to be 10 to 40 vol. %, preferably 10 to 30 vol. %.

The composition of the invention can be processed to the friction material by the dry mold system, wherein, after the agitation and mixing of the composition, prepress is carried out in dry process and, via the hot molding, heat treatment and then polishing are given.

The clutch facing according to the formulation of the invention has equal or higher frictional performance and strength than those of semi-mold type one below, and, in addition, it has an advantage capable of being manufactured inexpensively.

In following, examples used glass fibers and rock wool having large spring back as the inorganic fibers will be shown.

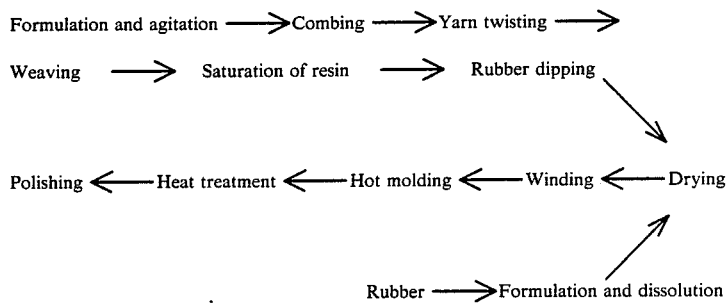

EXAMPLE

TABLE 1

| Example Component | Examples of formulation (vol. %) | | |
|---|---|---|---|
| | Formulation A | Formulation B | Formulation C |
| Phenol resin | 38 | 37 | 37 |
| Calcium carbonate | 12 | 12 | 12 |
| Cashew dust | 28 | 7 | 7 |
| Aramid pulp | 6 | 1 | 1 |
| Cork powder | 3 | 6 | 6 |
| Glass fibers | 13 | 37 | 25 |
| Rock wool | — | — | 12 |

From respective formulations shown as examples of formulation A, B and C, the clutch facings were manufactured by the dry mold system according to usual method, and the tests of frictional performance (wear) and burst strength were made to obtain the results in Table 2.

Based on these results, the compositions of the invention are recognized to have equal or higher frictional performance and burst strength than those of semi-mold type one. In addition, there exists a characteristic to be manufactured inexpensively.

TABLE 2

| | | | Formulation A | | Formulation B | | Formulation C | | Formulation D | |
|---|---|---|---|---|---|---|---|---|---|---|
| Constant speed. D 4311 | Friction coeff. | Rate of wear × $10^{-7}$ cm³/kg.m | | | | | | | | |
| | | 100° C. | 0.40 | 1.0 | 0.45 | 2.0 | 0.47 | 2.6 | 0.38 | 3.2 |
| | | 150° C. | 0.38 | 1.8 | 0.40 | 2.6 | 0.44 | 2.7 | 0.38 | 3.2 |
| | | 200° C. | 0.35 | 2.2 | 0.38 | 3.0 | 0.40 | 2.9 | 0.41 | 3.6 |
| | | 250° C. | 0.30 | 4.0 | 0.30 | 5.0 | 0.29 | 6.8 | 0.257 | 7.5 |
| Burst strength 200° C. × 5 min $\phi200 \times \phi139 \times t7.5$ | | | 8000–9000 rpm | | 9000–12000 rpm | | 8000–10000 rpm | | 9000–1000 rpm | |

*Test method of frictional efficiency by constant speed test machine according to JIS

What is claimed is:

1. A non-asbestos friction composition capable of being produced by a dry process, which consists essentially of about 1-10 vol. % of aramid fiber pulp, about 10-40 vol. % of inorganic fibers, effective amounts of a binder resin and a friction modifier, and about 1-6 vol. % of cork powder as a processing aid.

2. The composition according to claim 1, wherein said inorganic fibers have a diameter of 6 to 13 μm, and a length of less than 10 mm.

3. The composition according to claim 1, wherein said inorganic fibers are glass fibers, rock wool or a combination thereof.

4. The composition according to claim 1, wherein said inorganic fibers are contained in the amount of 10 to 30 vol. %.

5. The composition according to claim 1 which contains phenol resin as said binder, calcium carbonate, cashew dust as said friction modifier, and glass fibers or rock wool or a mixture thereof as said inorganic fibers.

* * * * *